United States Patent [19]

Carlson et al.

[11] Patent Number: 5,193,025
[45] Date of Patent: Mar. 9, 1993

[54] OPTICAL VIEWING AND NEAR INFRARED TRACKING SYSTEM FOR A PORTABLE MISSLE LAUNCHER

[75] Inventors: James J. Carlson, Woodland Hills; Gary R. Noyes, Los Angeles, both of Calif.

[73] Assignee: Hughes Aircraft Company, Los Angeles, Calif.

[21] Appl. No.: 823,413

[22] Filed: Jan. 21, 1992

[51] Int. Cl.$^5$ ............................ G02B 1/10; G02B 5/28; G02B 13/14
[52] U.S. Cl. .................................. 359/356; 359/359; 359/583; 359/589
[58] Field of Search ............... 359/352, 353, 355, 356, 359/357, 583, 589, 634, 359, 360

[56] References Cited

U.S. PATENT DOCUMENTS

| | | | |
|---|---|---|---|
| 2,700,323 | 1/1955 | Schroder | 359/589 |
| 4,260,021 | 4/1981 | Traeger et al. | 359/353 |
| 4,733,926 | 3/1988 | Title | 359/352 |
| 4,881,796 | 11/1989 | Michika et al. | 359/634 |
| 5,022,723 | 6/1991 | Schmidt et al. | 359/355 |
| 5,084,780 | 1/1992 | Phillips | 359/353 |

FOREIGN PATENT DOCUMENTS 1203491 10/1965 Fed. Rep. of Germany ...... 359/353

Primary Examiner—Martin Lerner
Attorney, Agent, or Firm—C. D. Brown; R. M. Heald; W. K. Denson-Low

[57] ABSTRACT

An optical system (10) for portable missile launcher (23) includes an objective lens (12) for receiving the entire visual and near infrared light energy emanating from a target (14) and immediate background of the target. The light energy from the objective lens then passes through a Porro prism assembly (16) which acts to direct visual light along a first path to an eyepiece (20) and near infrared along a second path at approximately a right angle to the first path where it is received by a tracker assembly (22) and monitored. The Porro prism (16) is constructed in accordance with this invention to include a multi-layer interference dichroic coating (18) disposed between the two prisms (34,36) which make up the prism assembly. This coating is of such a nature as to readily permit light energy in the visual range to pass directly through the coating, but at the same time to reflect the near infrared components along a second path bringing them to focus on the tracker assembly (22).

4 Claims, 3 Drawing Sheets

OPTICAL VIEWING AND NEAR INFRARED TRACKING SYSTEM FOR A PORTABLE MISSLE LAUNCHER

BACKGROUND OF THE INVENTION

1. Field of the Invention

The present invention relates generally to a missile launcher, and, more particularly, to an optical and infrared TRACKING system for use in such a missile launcher to split the optical information received from a target into visible light portions and near infrared components.

2. Description of Related Art

Known portable missile launchers at the present time include both direct viewing capability and near infrared traffic equipment (specifically, direct viewing is utilized during daylight when the target is relatively exposed and not camouflaged). The near infrared tracking system is used to follow a beacon mounted in the rear of the missile with signals generated thereby utilized to redirect the missile, if needed, along such a path as to effect engagement with the target.

Known dual systems of this kind utilize separate visual and near infrared objective lenses with separate optical axes which require periodic in-field adjustments to assure and maintain boresight. These are both inconvenient and time consuming in necessitating the user of the equipment to make adjustments in both systems for realignment purposes to achieve boresight control.

SUMMARY OF THE DISCLOSURE

The optical apparatus for the missile launcher includes an objective lens for receiving the entire visual and near infrared light energy emanating from the target, immediate background of the target and missile. The light energy from the objective lens then passes through a Porro prism assembly which acts to direct visual light energy along a first path to an eyepiece and near infrared energy along a second path at approximately a right angle to the first path where it is received by a tracker assembly and monitored. The Porro prism is specially constructed in accordance with this invention to include a multi-layer interference dichroic coating disposed between the two prisms which make up the prism assembly. This coating is of such a nature as to readily permit light energy in the visual range to pass directly through the coating, but at the same time to reflect the near infrared components along the second path bringing them to focus on the tracker assembly.

DESCRIPTION OF A PREFERRED EMBODIMENT

Figure 1:
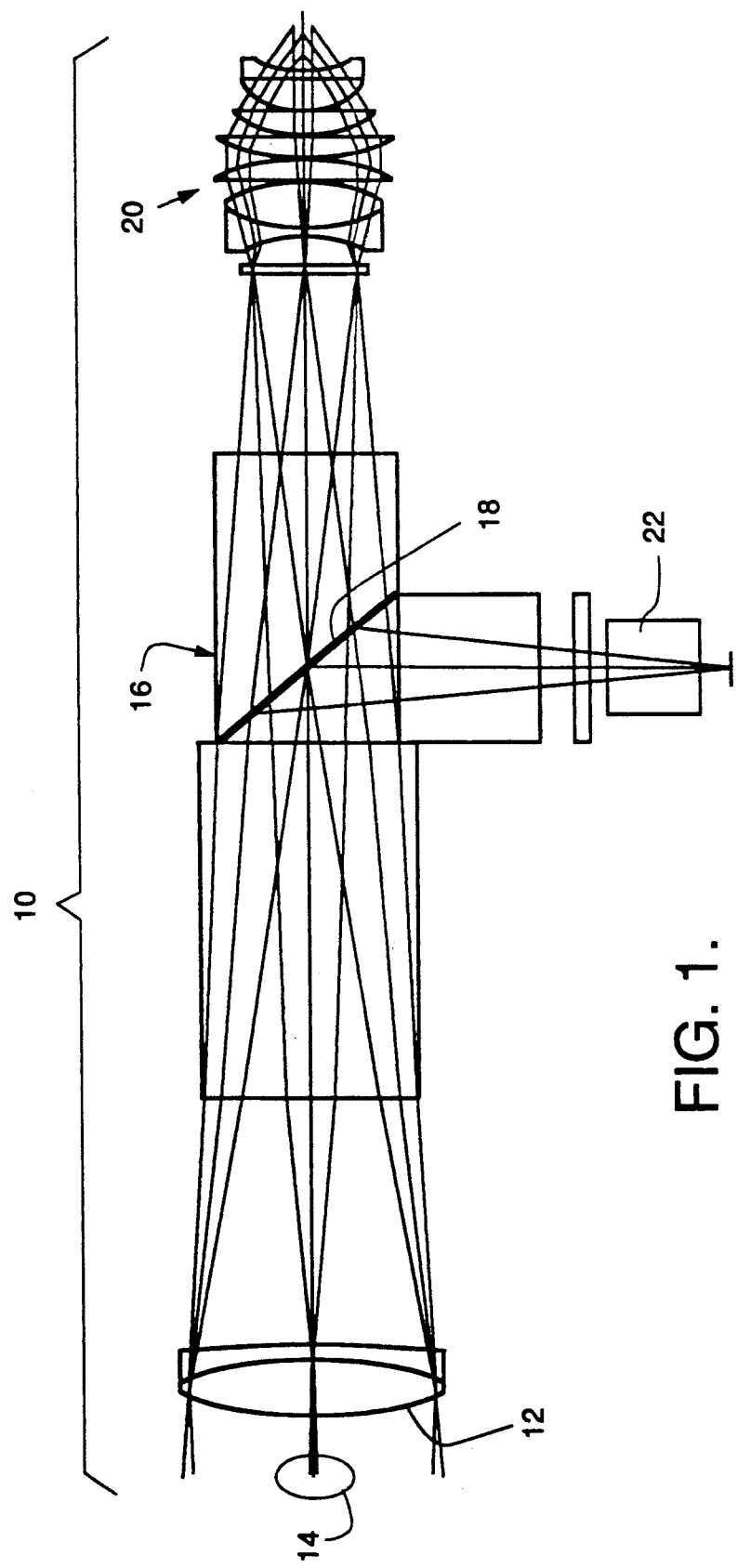
FIG. 1 is an elevational schematic of the system of the present invention.

Turning now to the drawing and particularly FIG. 1, the optical system of the present invention is enumerated generally as 10 which in its broadest comprehension is seen to include an objective lens 12 for receiving light energy from an object 14, namely, both visible energy as well as energy in the near infrared.

Light from the objective 12 passes through a Porro prism 16 which is a device having two right-angle prisms assembled together at right angles to one another for inverting and reverting images. For further details of the Porro prism, reference is made to page 13–26 of *Military Standardization Handbook*, OPTICAL DESIGN MIL-HDBK-141, Oct. 5, 1962. As will be more particularly described, the prism contains a multi-layer coating 18 which permits electromagnetic energy in the visible range to pass therethrough for direct receipt and examination by an eyepiece 20. In addition, the coating 18 redirects impinging near infrared energy along a different path for receipt by near infrared tracking processing equipment 22.

Figure 2:
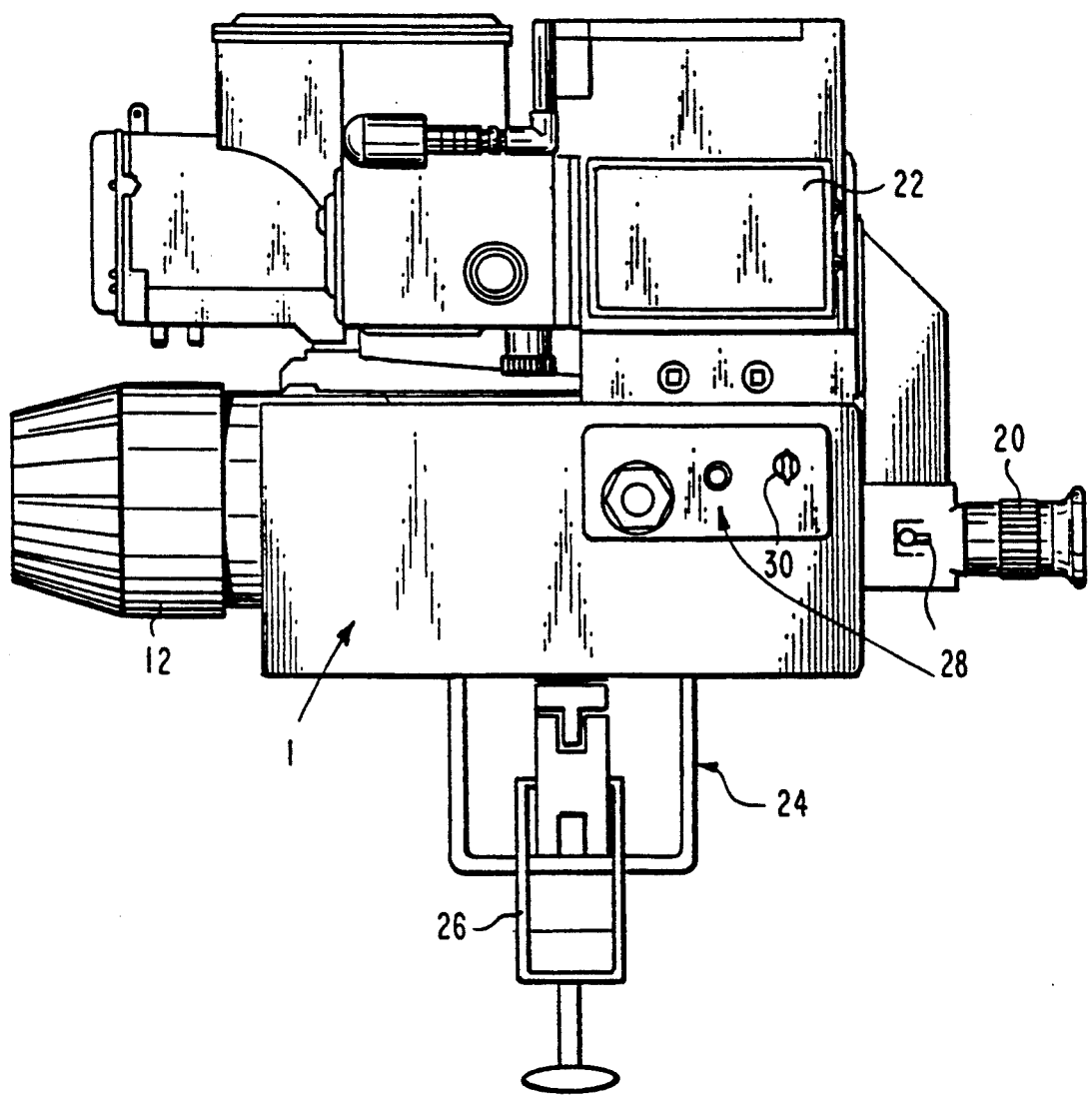
FIG. 2 is a side elevational view of a portable launcher with which the present invention is especially advantageously employed.

FIG. 2 shows, in a side elevational view, portable apparatus 23 for accomplishing missile launcher target sighting both by a visual method and by infrared sensing. On a common base 24, which may include a carrying handle 26, the electromagnetic energy from a target object is collected by the object lens 12 at the forward end and monitored by the eyepiece 20 at the rear. The near infrared processing equipment 22 is mounted conveniently adjacent to the visible optical system. Auxiliary missile launch controls 28 are mounted immediately adjacent the eyepiece 20 and a hand switch 30 is provided to control a reticle light, for example.

Figure 3:
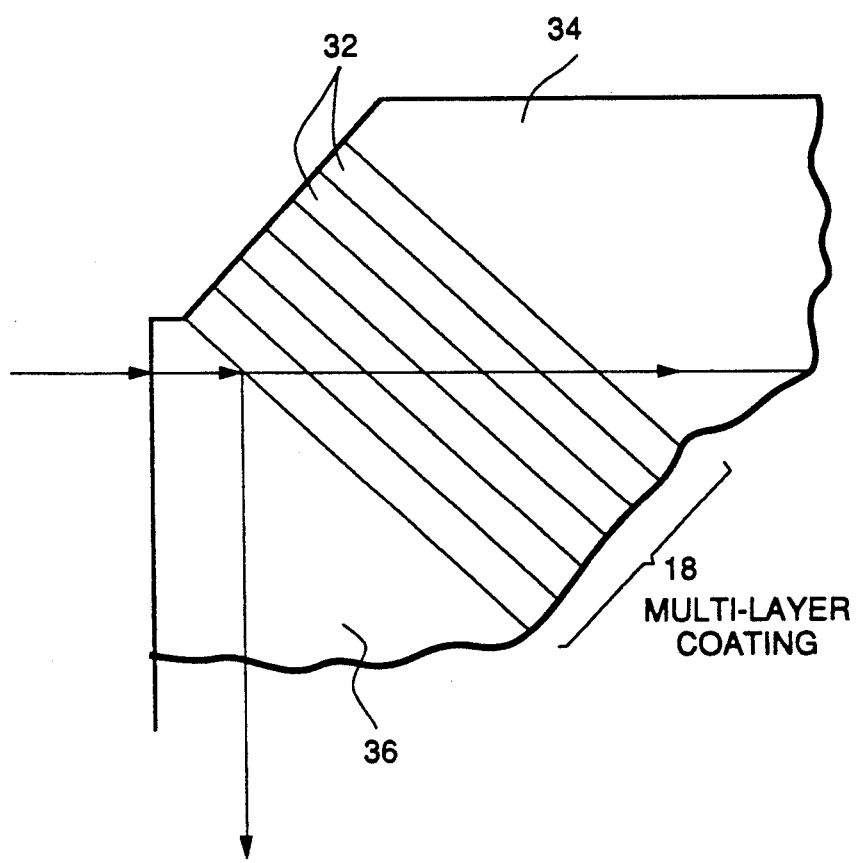
FIG. 3 is an enlarged schematic showing the various layers of a multi-layer dichroic beamsplitter for use in this invention.

With reference now to FIG. 3 there is shown in enlarged section the assembly of a plurality of thin film layers to form the multi-layer coating 18 for use in the Porro prism to act as a dichroic beamsplitter. More particularly, the coating 18 is composed of a plurality of very thin films 32 deposited on, say, the angular face of one of the prism elements 34. Finally, the second prism element 36 is then abutted against the coating 18 as shown in FIG. 3. This coating 18, which may also be referred to as an "interference coating", serves to spectrally control the light entering the Porro prism passing the near infrared light components through the second prism element 36 and allowing the visible light components to proceed through prism element 34 on toward the eyepiece.

The coating 18 can be a dichroic dielectric coating constructed of an $MgF_2$ layer followed by a three-layer stack repeated six times where the three-layer stack consists of two $MgF_2$ layers sandwiched about a ZnS layer. The initial $MgF_2$ layer preferably has a thickness of 0.78 of a wavelength, the three-layer stack $MgF_2$ layers are each 0.5 wavelength thick, and each ZnS layer has a thickness of 1.0 wavelength. For present purposes, the wavelength will preferably be about 0.75 microns.

Through the practice of the present invention both near infrared light energy and visual light energy emanating from a target object are received through a single objective lens. Visual examination is made through an eyepiece, and, by the action of the beamsplitter in the Porro prism, the infrared components are shunted off the optical viewing axis for sensing and processing. In this way, the difficulties encountered in use of the present known systems requiring separate adjustments and manipulations for near infrared tracking and for visual examination are avoided.

Although the present invention has been described with a preferred embodiment, it is to be understood that those skilled in the appertaining optical arts may suggest modifications that are within the spirit of the invention and come within the ambit of the appended claims.

What is claimed is:

1. An optical system in a portable missile launcher for receiving visual and near infrared light energy from a target and missile beacon, comprising:

an objective lens;

an eyepiece located on a common optical axis with the objective lens;

a prism assembly located on said optical axis between the objective lens and eyepiece, said prism assembly including first and second prisms with facing surfaces, an interference coating located between the prism facing surfaces allowing visual light energy to be directed along the optical axis to the eyepiece and the near infrared light along a path off angle to the optical axis, said interference coating being constructed of a plurality of dielectric layers laid down on one of the prism facing surfaces in a stack with an outer layer of the stack being constructed of $MgF_2$ having a 0.78 wavelength thickness, and the remaining layers in the stack being formed from a plurality of three-layer elements, each element including a pair of 0.5 wavelength layers sandwiched about a 1.0 wavelength layer of ZnS.

2. An optical system as in claim 1, in which the wavelength is about 0.75 microns.

3. A prism assembly for use in the optical apparatus of a missile launcher for directing visual and near infrared light energy components along first and second substantially different angular paths, comprising:

first and second prisms with a single flat surface of each arranged facing one another;

a plurality of layers stacked between the facing flat surfaces of the prisms, said layers forming an interference coating allowing impinging visual electromagnetic energy to pass through the coating while reflecting near infrared components away from the coating, an outer layer of the coating being constructed of $MgF_2$ having a 0.78 wavelength thickness, and the remaining layers in the coating being formed from a plurality of three-layer elements, each element including a pair of 0.5 wavelength layers sandwiched about a 1.0 wavelength layer of ZnS.

4. A prism assembly as in claim 3, in which the wavelength is about 0.75 microns.

* * * * *